March 23, 1954 N. H. ODELL 2,673,312
SEMICONDUCTOR DEVICE
Filed Dec. 4, 1952
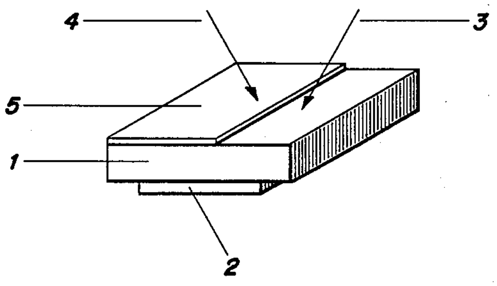
INVENTOR.
NEWTON H. ODELL
BY T. L. Bowes
ATTORNEY Patented Mar. 23, 1954 2,673,312

UNITED STATES PATENT OFFICE 2,673,312

SEMICONDUCTOR DEVICE

Newton H. Odell, Bethlehem, Pa., assignor to Stromberg-Carlson Company, a corporation of New York Application December 4, 1952, Serial No. 324,053

3 Claims. (Cl. 317—235)

My invention relates to electrical translation devices, and more particularly to electrical translation devices of the semi-conductor type.

Semi-conductor translating devices known heretofore exhibit a very low input impedance. Since many, if not most, applications for electrical translation devices involve connection of the translating device to a high impedance source of potential, it is desirable that semi-conductor devices have a high input impedance.

It is accordingly an object of my invention to provide a semi-conductor device having a high input impedance.

It is another object of my invention to provide a semi-conductor device in which a high input impedance is achieved by interposing a layer of titanium dioxide between the body of the semi-conductor device and the contact area of the emitter electrode.

Further objects and advantages of my invention will become apparent as the following description proceeds and the features of novelty which characterize my invention will be pointed out with particularity in the claims annexed to and forming a part of this specification.

For a better understanding of my invention, reference may be had to the accompanying drawing, which shows partly in schematic form and partly in perspective form one embodiment of my invention.

The semi-conductor device shown in the drawing has a body 1 of semi-conducting material which may principally comprise metallic germanium. A base electrode 2 has a relatively broad area of contact with body 1, and forms a suitable connection means therewith. Also in contact with body 1 is a collector electrode 3, which may be arranged to contact a portion of the top surface of the body. Collector electrode 3 is indicated only schematically in the drawing, since the specific arrangement for securing electrode 3 in contact with body 1 may be of any suitable type, and the latter are well known to those skilled in the semi-conductor art.

The semi-conductor device illustrated in the drawing is provided with an emitter electrode 4, which may be biased by any suitable means, such as that used for collector electrode 3, toward body 1. According to my invention, I interpose a layer 5 of insulating material between the contact area of the emitter electrode and the body. I prefer that this insulating material be titanium dioxide. I further prefer that this layer be monomolecular in thickness, or on the order of one Ångstrom.

Although I have illustrated layer 5 as extending over approximately half of the upper surface of body 1, my invention is in no wise restricted to this shape or proportion. It is only necessary that the insulating layer 5 be large enough to cover the area directly beneath the contact area of the emitter electrode.

While I have shown and described a specific embodiment of my invention, I do not desire my invention to be limited to the specific arrangement shown and described, and I intend in the appended claims to cover all modifications within the spirit and scope of my invention.

What I claim is:

1. In a semi-conductor device, the combination of a semi-conducting body; a base electrode in contact with said body; a collector electrode in contact with said body; a layer of titanium dioxide covering at least a portion of the area of said body; and an emitter electrode in contact with said layer.

2. In a semi-conductor device, the combination of a semi-conducting body; a base electrode in contact with said body; a collector electrode in contact with said body; a monomolecular layer of titanium dioxide covering at least a portion of the area of said body; and an emitter electrode in contact with said layer.

3. In a semi-conductor device, the combination of a semi-conducting body; a base electrode in contact with said body; a collector electrode in contact with said body; a monomolecular layer of titanium dioxide evaporated onto at least a portion of the area of said body; and an emitter electrode in contact with said layer.

NEWTON H. ODELL.

References Cited in the file of this patent

UNITED STATES PATENTS

| Number | Name | Date |
|---|---|---|
| 2,608,722 | Stuetzer | Sept. 2, 1952 |
| 2,612,567 | Stuetzer | Sept. 30, 1952 |
| 2,618,690 | Steutzer | Nov. 18, 1952 |